(12) United States Patent
Hubinak et al.

(10) Patent No.: US 8,275,364 B2
(45) Date of Patent: Sep. 25, 2012

(54) SYSTEMS AND METHODS FOR CONTACTLESS PAYMENT AUTHORIZATION

(75) Inventors: Emil Hubinak, Piestany (SK); Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 218 days.

(21) Appl. No.: 12/669,116

(22) PCT Filed: Dec. 30, 2008

(86) PCT No.: PCT/IB2008/055587
§ 371 (c)(1),
(2), (4) Date: Jan. 14, 2010

(87) PCT Pub. No.: WO2009/087539
PCT Pub. Date: Jul. 16, 2009

(65) Prior Publication Data
US 2010/0203870 A1 Aug. 12, 2010

(30) Foreign Application Priority Data
Jan. 4, 2008 (SK) .................................. 5004-2008

(51) Int. Cl.
*H04M 3/42* (2006.01)
*G06Q 40/00* (2006.01)

(52) U.S. Cl. ........................................ 455/414.2; 705/44

(58) Field of Classification Search ............... 455/414.1, 455/418, 419, 466, 411, 410, 412.1, 415, 455/420, 421, 422.1; 726/7; 705/44, 71; 713/176; 235/380, 375, 379, 487, 386
See application file for complete search history.

(56) References Cited

U.S. PATENT DOCUMENTS

| | | |
|---|---|---|
| 5,574,470 A | 11/1996 | de Vall |
| 5,608,417 A | 3/1997 | de Vall |
| 6,062,472 A | 5/2000 | Cheung |
| 6,070,795 A | 6/2000 | Feiken |

(Continued)

FOREIGN PATENT DOCUMENTS

CN 1450782 10/2003

(Continued)

OTHER PUBLICATIONS

"EMV Mobile Contactless Payment: Technical Issues and Position Paper", www.emvco.com/mobile.aspx, © Oct. 11, 2007, accessed Apr. 20, 2009, 37 pages.

(Continued)

*Primary Examiner* — Melody Mehrpour
(74) *Attorney, Agent, or Firm* — Woodcock Washburn LLP

(57) ABSTRACT

The method and system of authentication of authorized person and transaction approval principally at the direct debits by means of a mobile communication device (2) is based on the fact that an alphanumerical chain is sent from the mobile communication device (2) into energy passive identifier (3) approached to the mobile communication device (2), the identifier (3) is supplied contact free by electromagnetic field of the mobile communication device (2) while in the identifier the received alphanumerical chain is signed electronically and in such signed alphanumerical chain is sent back into the mobile communication device (2). Payment approval is realized by the correctness approval of the electronically signed alphanumerical chain and by approaching the mobile communication device (2) to the payment terminal (1). The invention enables to use a high level of cryptography security by using a passive identifier (3) which does not demand own energy source.

20 Claims, 2 Drawing Sheets

U.S. PATENT DOCUMENTS

| | | |
|---|---|---|
| 6,070,796 A | 6/2000 | Sirbu |
| 6,450,407 B1 | 9/2002 | Freeman et al. |
| 6,615,243 B1 | 9/2003 | Meggeid et al. |
| 6,745,935 B1 | 6/2004 | Grieu et al. |
| 6,828,670 B2 | 12/2004 | Hayana et al. |
| 6,976,011 B1 | 12/2005 | Capitant et al. |
| 7,364,092 B2 | 4/2008 | Narendra et al. |
| 7,374,100 B2 | 5/2008 | Jei et al. |
| 7,436,965 B2 | 10/2008 | Sherman |
| 7,458,518 B2 | 12/2008 | Fukuda et al. |
| 7,481,358 B2 | 1/2009 | Honjo et al. |
| 7,568,065 B2 | 7/2009 | D'Athis |
| 7,581,678 B2 | 9/2009 | Narendra et al. |
| 7,689,932 B2 | 3/2010 | Maktedar |
| 7,805,615 B2 | 9/2010 | Narendra et al. |
| 7,828,214 B2 | 11/2010 | Narendra et al. |
| 8,055,184 B1 | 11/2011 | DiMartino et al. |
| 8,127,999 B2 | 3/2012 | Diamond |
| 2001/0005832 A1 | 6/2001 | Cofta |
| 2002/0147658 A1 | 10/2002 | Kwan |
| 2003/0138135 A1* | 7/2003 | Chung et al. ............. 382/119 |
| 2004/0606278 | 4/2004 | Hughes et al. |
| 2004/0087339 A1 | 5/2004 | Goldthwaite et al. |
| 2004/0127256 A1 | 7/2004 | Goldthwaite et al. |
| 2005/0072595 A1 | 4/2005 | Cho |
| 2005/0092835 A1* | 5/2005 | Chung et al. ............. 235/386 |
| 2005/0116050 A1 | 6/2005 | Jei et al. |
| 2005/0269401 A1 | 12/2005 | Spitzer et al. |
| 2005/0269402 A1 | 12/2005 | Spitzer et al. |
| 2006/0143578 A1 | 6/2006 | Maktedar |
| 2006/0186209 A1 | 8/2006 | Narendra et al. |
| 2006/0219776 A1 | 10/2006 | Finn |
| 2006/0226217 A1 | 10/2006 | Narendra et al. |
| 2006/0255160 A1 | 11/2006 | Winkler |
| 2007/0014407 A1 | 1/2007 | Narendra et al. |
| 2007/0014408 A1 | 1/2007 | Narendra et al. |
| 2007/0016957 A1 | 1/2007 | Seaward et al. |
| 2007/0050871 A1 | 3/2007 | Mashhour |
| 2007/0083772 A1 | 4/2007 | Harada et al. |
| 2007/0106564 A1 | 5/2007 | Matotek et al. |
| 2007/0125840 A1 | 6/2007 | Law et al. |
| 2007/0152035 A1 | 7/2007 | Adams et al. |
| 2007/0158438 A1 | 7/2007 | Fukuda et al. |
| 2007/0192840 A1 | 8/2007 | Pesonen |
| 2007/0233615 A1 | 10/2007 | Tumminaro |
| 2007/0278290 A1 | 12/2007 | Messerges et al. |
| 2008/0048036 A1 | 2/2008 | Matsumoto et al. |
| 2008/0059375 A1 | 3/2008 | Abifaker |
| 2008/0093467 A1 | 4/2008 | Narendra et al. |
| 2008/0120129 A1* | 5/2008 | Seubert et al. ............... 705/1 |
| 2008/0233906 A1 | 9/2008 | Mitomo et al. |
| 2008/0250244 A1 | 10/2008 | Baentsch et al. |
| 2008/0306828 A1 | 12/2008 | Chao |
| 2009/0065571 A1 | 3/2009 | Jain et al. |
| 2009/0065572 A1 | 3/2009 | Jain et al. |
| 2009/0069049 A1 | 3/2009 | Jain et al. |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain et al. |
| 2009/0070691 A1 | 3/2009 | Jain et al. |
| 2009/0070861 A1 | 3/2009 | Jain et al. |
| 2009/0108063 A1 | 4/2009 | Jain et al. |
| 2009/0119190 A1 | 5/2009 | Realini |
| 2009/0124273 A1 | 5/2009 | Back |
| 2009/0191812 A1 | 7/2009 | Teruyama et al. |
| 2009/0193491 A1 | 7/2009 | Rao |
| 2009/0199283 A1 | 8/2009 | Jain et al. |
| 2009/0200371 A1 | 8/2009 | Kean et al. |
| 2009/0261172 A1 | 10/2009 | Kumar et al. |
| 2009/0265544 A1 | 10/2009 | Moona et al. |
| 2009/0265552 A1 | 10/2009 | Moshir et al. |
| 2009/0298540 A1 | 12/2009 | Narendra et al. |
| 2009/0307139 A1 | 12/2009 | Mardikar et al. |
| 2009/0307142 A1 | 12/2009 | Mardikar |
| 2009/0319287 A1 | 12/2009 | Hammad et al. |
| 2010/0023449 A1 | 1/2010 | Skowronek et al. |
| 2010/0044444 A1 | 2/2010 | Jain et al. |
| 2010/0045425 A1 | 2/2010 | Chivallier |
| 2010/0062808 A1 | 3/2010 | Cha et al. |
| 2010/0063893 A1 | 3/2010 | Townsend |
| 2010/0205432 A1 | 8/2010 | Corda et al. |
| 2010/0213265 A1 | 8/2010 | Narendra et al. |
| 2010/0258639 A1 | 10/2010 | Florek et al. |
| 2010/0262503 A1 | 10/2010 | Florek et al. |
| 2010/0274677 A1 | 10/2010 | Florek et al. |
| 2010/0274726 A1 | 10/2010 | Florek et al. |
| 2010/0323617 A1 | 12/2010 | Hubinak et al. |
| 2011/0282753 A1* | 11/2011 | Mullen et al. .............. 705/14.73 |

FOREIGN PATENT DOCUMENTS

| | | |
|---|---|---|
| CN | 1627321 | 6/2005 |
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/044041 | 4/2010 |
| WO | WO 2010/097777 | 9/2010 |

| | | |
|---|---|---|
| WO | WO 2010/122520 | 10/2010 |
| WO | WO 2010/128442 | 11/2010 |
| WO | WO 2010/131226 | 11/2010 |

OTHER PUBLICATIONS

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

Madlmayar et al., "Management of Multiple Cards in NFC-Deivces", LNCS, 2008, 21 pages.

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

* cited by examiner

SYSTEMS AND METHODS FOR CONTACTLESS PAYMENT AUTHORIZATION

CROSS-REFERENCE TO RELATED APPLICATIONS

This application is the National Stage of International Application No. PCT/IB2008/055587, filed 30 Dec. 2008, which claims the benefit of Slovak Patent Application No. PP 5004-2008, filed 4 Jan. 2008, the disclosure of which is incorporated herein by reference in its entirety.

FIELD OF INVENTION

The invention relates to a method and a system of authenticity of authorized persons and transaction approval, particularly at direct debits (noncash payment system) by means of a mobile communication device, principally a mobile phone connected to a payment terminal where the mobile communication device functions as a payment card. The invention also concerns an identifier, used for authentication and manipulation, due to which the approval with the operation, principally payment transaction is indicated.

PRESENT TECHNOLOGY STATUS

Debit cards, of which the payment confirmation is made by its submitting and entering the correct PIN, are frequently used by direct debits. Very often the direct debit is realized in such way that the purchaser at the payment submits the payment card to the trader who inserts it in the terminal and asks the purchaser to agree the total sum of the purchase. The purchaser enters, mostly with the small keyboard, the PIN into the terminal and the payment is confirmed. By means of PIN the purchasers authenticate themselves at the payment via magnetic, chip or contact free (RFID) payment cards and also at the payments by mobile phones when the act of payment can by done by means of payment terminals or mobile banking direct payments.

Known are more methods and technical means which substitute manual PIN entering in the mobile phone and also by which the confirmation of the direct debit is made. For example according to the published PCT application form WO 2005/086456 A1, RFID chip is used in a small movable card located separately from the mobile phone. RFID technology is described also in patents and patent registrations: EP 1 536 573 A2, CN 1627321 A, KR20040060249, WO 2007/136939 A2, WO 2006/009460 A1. However, RFID chip was developed for applications with a lower level of security such as pallet monitoring in a warehouse, input and distribution of the goods et cetera. RFID technology does not enable the active cryptography of to be approved alphanumerical chain neither without a contact connection between the RFID identifier and the source nor without the use of the own energy source like battery. The use of NFC technology is known also in patents and patent registrations: EP 1 729 253 A1, DE 10 2006 019 628 A1, CN 1835007. However, known is no solution, by which the passive identifier is used without own energy source but making cryptographic operations itself.

Until now known methods and devices did not ensure sufficiently high level of security with passive identifiers, since they can be copied and imitated easily. Active identifiers, on the other hand, demand the own energy source able to supply the hardware of the identifier by energy needed for cryptography of the approving code or a contact connection to a communication device to supply with the energy. However, both methods are uncomfortable and time-consuming.

BACKGROUND TO INVENTION

Disadvantages mentioned above are eliminated significantly by the method of authenticity and/or agreement approval at the direct debits through the separate identifier according to this invention, of which bedrock is based on the fact that after activating the payment process or payment process preparation in the mobile communication device, the device sends alphanumerical chain into the identifier approached to the mobile communication device. The identifier is approached in the distance shorter than 10 cm, mostly it may touch the mobile communication device directly. However, the contact or the contact point setting is not essential or necessary since the communication between the mobile communication device and the identifier is wireless. At this point, the identifier is by means of energy supplied contact free from the electromagnetic field of the mobile communication device, receives alphanumerical chain and realizes its processing in the form of an electronic signature. The received alphanumerical chain is signed electronically in the identifier and such established signed alphanumerical chain is sent back to the mobile communication device where the correctness is checked. If the correctness is verified and at the same time the owner approves the payment transaction, the mobile communication device will be approached to the distance, suitably less than 10 cm from the reading unit of the payment terminal.

It is advantageous if the electronic signature of the received alphanumerical chain is made by the process with the help of a private key saved in the memory of the identifier. To the energy supply of the identifier circuits is used direct and/or while approaching, accumulated energy of the electromagnetic field of the mobile communication device, advantageously electromagnetic field created by transmitting unit of the mobile communication device which aim is to communicate with the identifier.

The invention enables to use cryptography of the authentication preserving the energy passivity of the separate identifier. The principal advantage is the high level of security at the satisfactory user comfort. Entering PIN code mostly consisting of four digits can be according to this invention, replaced by apposing the identifier working with more-bit-chain which is variable since the approving code transmitted from the identifier into the mobile communication device is changed according to the cryptography taking place in the identifier processor at every authentication process. By this, the higher level of security is achieved than at the RFID identifiers and the advantage of its passivity is remained. Such energy passivity enables to reduce the size of the identifier since there is no necessity to use own energy source by which the user comfort is increased as the user does not have to bother with identifier's charge or condition.

In a favorable configuration the mobile communication device may use at the payment processing and authentication a remote processing server to which it is connected via general mobile network, mainly the kind of GSM or GRPS net.

The bedrock of this invention is based on the system of authentication and/or agreement approval at the direct debits which concerns payment terminals, a separate identifier and a mobile communication device communicating with the payment terminal via contact free communication channel where the mobile communication device, preferably mobile phone, contains transmitting and receiving unit to allow the contact free communication with the identifier and where the identifier contains a processor for electronic signature of the received alphanumerical chain. Further more, the identifier contains transmitting and receiving unit to allow the communication with the mobile communication device, a block transforming the electromagnetic field into the electric energy and a memory. Components of the identifier are, from the energy point of view, supplied by electromagnetic field of the mobile communication device either directly by immediately gained energy or partially by energy accumulated during the approaching to the mobile communication device at the relevant payment process.

In a possible configuration the system includes a remote processing server connected to the mobile communication device through general mobile network, preferably via GSM or/and GPRS net. From the point of view of compatibleness with the existing, mass-spread devices and standards, it is suitable if the mobile communication device consists of a mobile phone, advantageously a mobile phone with NFC communication unit.

Disadvantages mentioned in the Present Technology Status are eliminated significantly by the identity identifier and/or agreement approval at the direct debits through communicating contact free with the mobile communication device, principally a mobile phone which is connected contact free to the payment terminal according to this invention, of which bedrock is based on the fact that it consists of a processor for electronic signature of the received alphanumerical chain, transmitting and receiving unit to communicate with the mobile communication device. Communication is principally based on receiving the alphanumerical chain and transmitting electronically signed alphanumerical chain. The identifier further more contains a memory, a block transforming the electromagnetic field into the electric energy. Transmitting and receiving unit and a block transforming the electromagnetic field into the electric energy are connected to the processor. Processor is also connected to the memory. Basically, all the units of the identifier are, from the energy point of view, supplied by electromagnetic field of the mobile communication device.

In an advantageous configuration, the identifier of identity and/or approval contains NFC chip and the memory contains a private key for electronic signature of alphanumerical chain received from the mobile communication device.

Utility attributions increase a configuration, where a part of the memory is reserved for the personal data of the user. This part of memory is adjusted to store the personal user data separately from the private key. In such case the identifier may be used like a health insurance card, identity card and so on. Rightness of data demand is evaluated in the processor of the identifier.

To increase the user comfort, the identifier may be located in a pendant and/or a key ring and/or a label and/or a beading.

The invention enables to higher the level of security and comfort of authenticity and direct debit approval since the user does not have to remember his PIN code. At the same time the invention increases the process of direct debit transaction since the mobile communication device functions as a wallet without any delay caused by the PIN code entering.

DESCRIPTION OF DRAWINGS

The invention is described in more details by means of pictures 1 and 2, where picture 1 shows the connection scheme of a payment terminal, a mobile communication device and an identifier at the direct debit transaction.

Picture 2 represents the scheme of connection between payment terminal, identifier and mobile communication device associated with a remote server at the direct debit transaction.

EXAMPLES OF APPLICATION

Example 1

Figure 1:
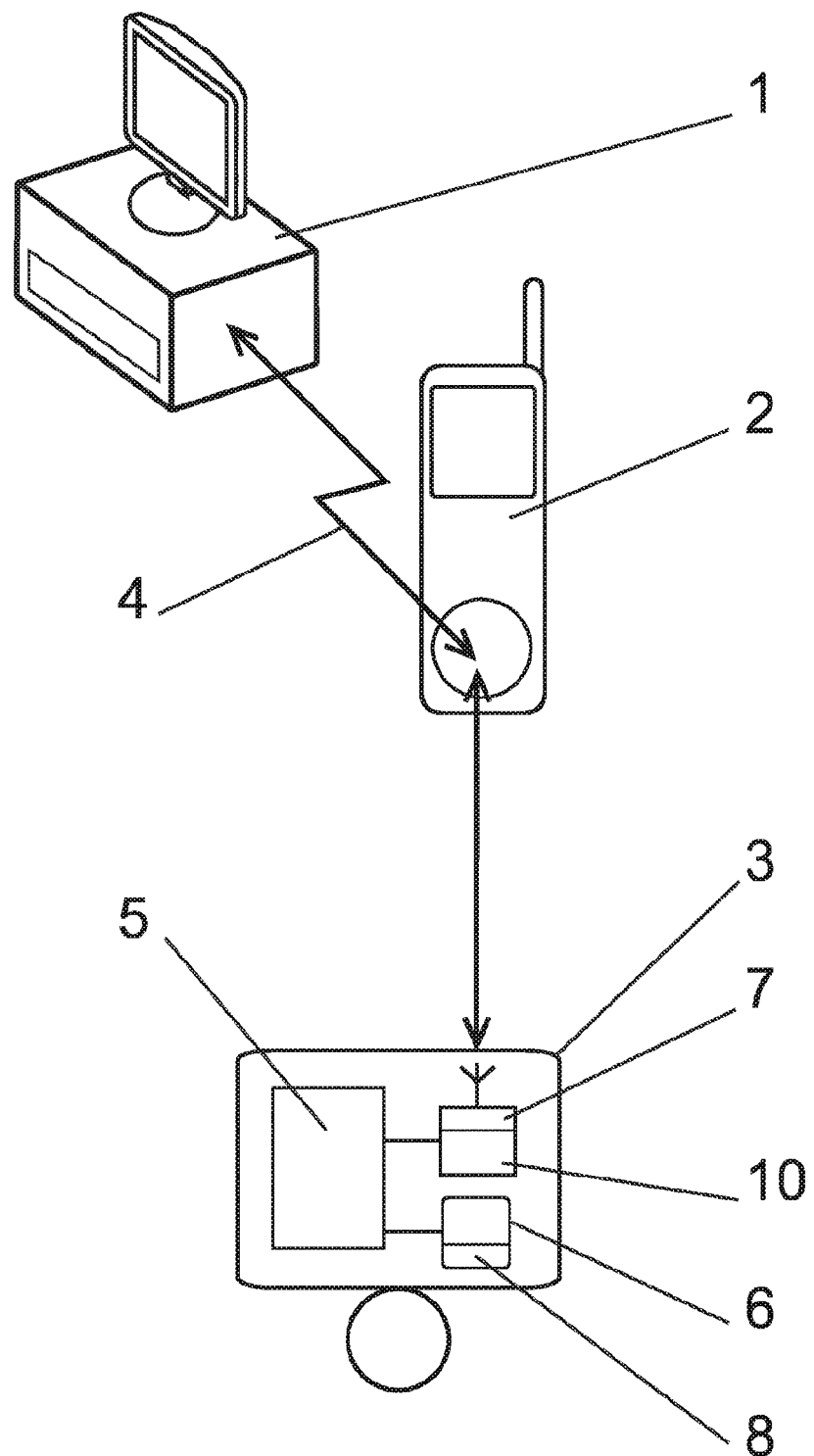
Figure 2:
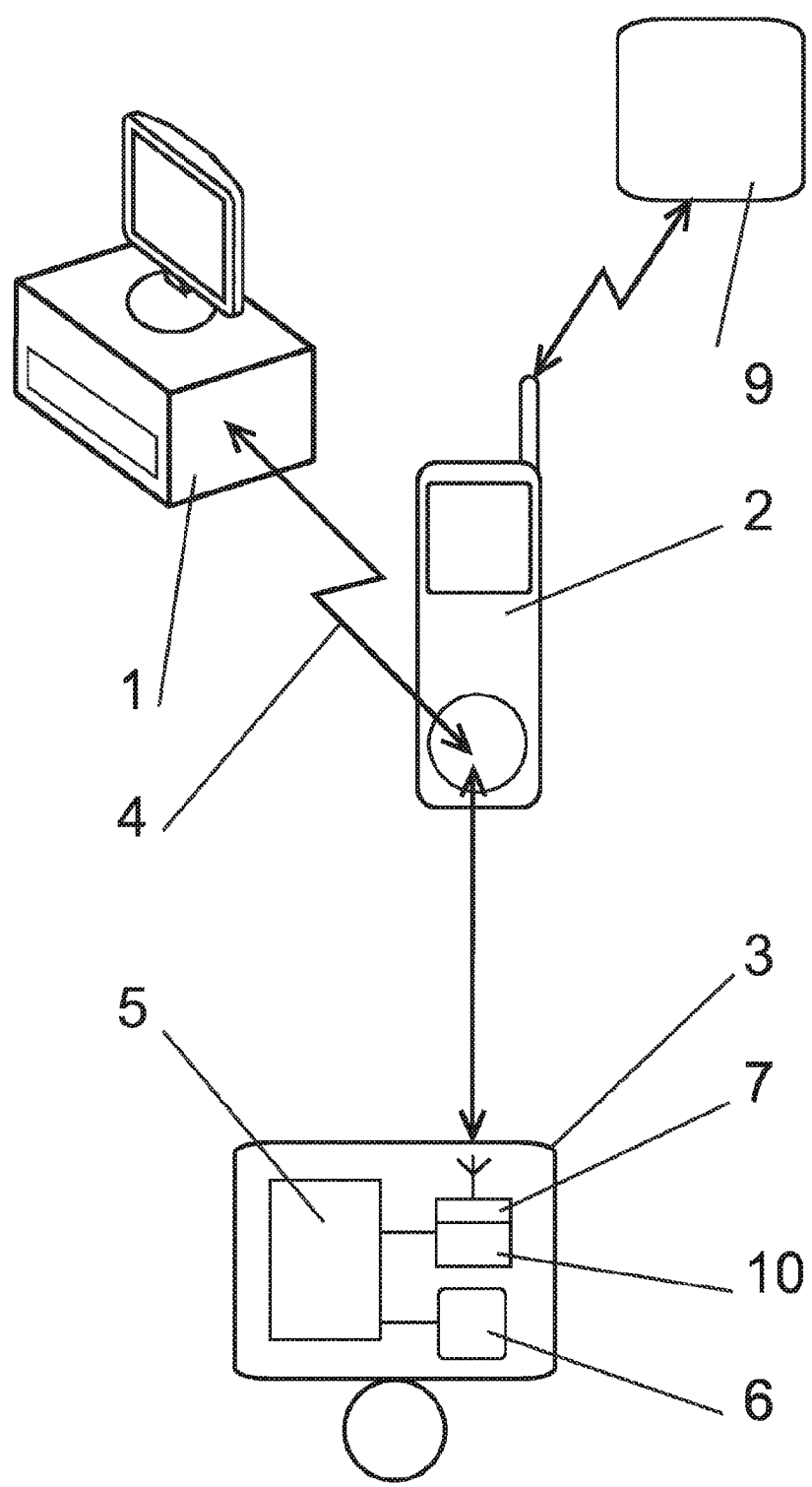

In this example the system contains a payment terminal 1 located at the cash register in a shop, a mobile communication device 2 represented by a mobile phone NOKIA 6131 serially equipped by NFC technology and an identifier 3 situated in a key ring.

The payment terminal 1 allows contact free radio communication with the mobile communication device 2 while the payment terminal 1 is of a common standard with usual functions and communication with payment servers at the bank central office or other similar institution such as authorized centers.

Mobile communication device 2, herein NOKIA 6131, functions as a payment card in such way that it contains in its memory a software application which enables to realize the payments in cooperation with the payment terminal 1. Needed data are sent via air from the mobile communication device 2 into the payment terminal 1 after the activation of the necessary payment process and approaching the mobile communication device 2 to the payment terminal 1, actually to NFC reader of the payment terminal 1.

Mobile communication device 2 allows a safe and correct recording and storing of the payment software application in a secured memory and has the ability to realize contact free radio communication between the payment terminal 1 and the identifier 3.

At the payment, except for approaching the mobile communication device 2 to payment terminal 1, it is needed to authenticate, approve the presence of the user at the payment and to confirm his agreement with the payment. To authentication and payment confirmation is used an identifier 3 containing a processor 5, which beside recording memory with the private key, is able to realize computationally operations which enable cryptography and decryption needed for electronic signature realization. The identifier 3 does not contain its own energy source (f.e. battery) and uses as energy source the electromagnetic field of the mobile communication device 2 which is processed in a block 10 of transformation. The identifier 3 is able to communicate with the external devices, principally mobile communication device 2, possibly the payment terminal 1 or programming devices, exclusively contact free via radio transmission.

The payment approval is given in such way that the mobile communication device 2 is either approached or directly put close to the identifier 3 in distance shorter than 10 cm, by which the alphanumerical chain is transmitted into the identifier 3. The identifier 3 receives the chain and signs it electronically by a private key and such signed alphanumerical chain sends back into the mobile communication device 2. These operations are completed by processing in a circuit of the identifier 3 via energy from the electromagnetic field of the mobile communication device 2. Receiving the correct alphanumerical code from the identifier 3 into the mobile communication device 2, the payment application of the mobile communication device 2 considers that the user approved the payment and that the user is authorized.

Correctness verification is basically reading of the electronically signed alphanumerical code via particular general key. Later the user approaches the mobile communication device 2 to the payment terminal 1, by which the payment process will be agreed in the payment terminal 1 from where the payment data are sent in a standard way to the bank or authorized centre. In a common practice, the payment transaction may be realized in such way that the user, while waiting at the cash desk activates in his mobile phone the payment process or preparation for this process. The user chooses from the menu on his display the account he wants the payment to be realized from and puts the identifier 3 closer to the mobile phone. The user, after the receipt is printed by the cash register, decides if he wants to pay the amount and if yes, the user approaches the mobile phone to the payment terminal 1, technically to its reading unit which is marked graphically. The payment terminal 1 prints out the receipt or according to the setting, the user receives SMS about the realized payment. This way the direct debit process will be speed up significantly.

In this example is a part 8 of the memory 6 reserved for the personal data of the user and the identifier 3, in a connection to a suitable reading unit of NFC chip, may be used as electronic ID, health insurance card and so on. Different kinds of such personal data are accessible by means of various levels of access rights evaluated by the processor 5.

Example 2

Example 2 differs from the above mentioned one in the way that the configuration contains a remote server 9 processing the payment transactions which are therein realized directly in the mobile communication unit 2. In this example the mobile communication device 2 works as a processing mediator and shows the processes which are realized in a distance as a viewer. The connection is made via GPRS data network.

INDUSTRIAL APPLICABILITY

Industrial applicability is obvious. According to this invention, it is possible to authenticate and approve the direct debit processes industrially and repeatedly, principally via a mobile phone with the use of a passive identifier.

According to this invention it is also possible to produce and use passive identifiers, principally by using NFC chip standards where the source, according to this invention, may be supplied by the electromagnetic field of the mobile communication device. The invention is also related to identifier which functions to authentication and approval indication and as well it may be used as a kind of personal cards.

LIST OF RELATED SYMBOLS

1—payment terminal
2—mobile communication device
3—identifier
4—contact free communication channel
5—processor
6—memory
7—transmitting and receiving unit
8—part of memory used for personal data
9—remote server
10—block of transformation

The invention claimed is:

1. A method for contactless payment authorization, the method comprising:
 initiating a payment process in a mobile communication device;
 communicating an alphanumeric string from the mobile communication device into an identifier located sufficiently near to the mobile communication device such that the identifier is supplied with energy from an electromagnetic field of the mobile communication device;
 electronically signing the received alphanumeric string in the identifier;
 sending the electronically signed alphanumeric string to the mobile communication device;
 verifying the electronically signed alphanumeric string in the mobile communication device; and
 placing the mobile communication device sufficiently near to the payment terminal to realize a payment.

2. The method of claim 1, further comprising locating the identifier within ten centimeters of the mobile communication device.

3. The method of claim 1, further comprising placing the mobile communication device within ten centimeters of the payment terminal to realize the payment.

4. The method of claim 1, wherein the mobile communication device is a mobile telephone.

5. The method of claim 1, wherein the mobile communication device is connected to a remote processing server through a public mobile network, and the mobile communication device uses the remote processing server for payment processing and/or authentication.

6. The method of claim 1, wherein the mobile communication device includes a near-field communication element that generates the electromagnetic field.

7. The method of claim 1, wherein the identifier comprises a memory that contains a key for use in electronically signing the received alphanumeric string, and wherein the received alphanumeric string is electronically signed in the processor using the key.

8. The method of claim 1, wherein mobile communication device comprises a receiving element for communication with the identifier, and wherein the electromagnetic field is generated by the receiving element.

9. A system for contactless payment authorization, the system comprising:
 an identifier; and
 a mobile communication device that communicates with a payment terminal over a near-field communication channel,
 wherein the mobile communication device is equipped with a transmitting and receiving element for contactless communication with the identifier, and
 wherein the identifier is supplied with electrical energy from an electromagnetic field of the mobile communication device and comprises a processor for electronically signing a received alphanumeric string, a transmitting and receiving element for communication with the mobile communication device, a block for transforming the electromagnetic field into the electrical energy, and a memory.

10. The system of claim 9, wherein the memory contains a stored identification number and a key for use in electronically signing the received alphanumeric string.

11. The system of claim 9, wherein the transmitting and receiving element in the mobile communication device and the transmitting and receiving element in the identifier are near-field communication units.

12. The system of claim 9, wherein the mobile communication device is a mobile phone.

13. The system of claim 9, wherein the mobile communication device is connected to a remote processing server through a public mobile network, and the mobile communication device uses the remote processing server for payment processing and/or authentication.

14. The method of claim 13, wherein the remote processing server is a Global System for Mobile communications (GSM) or General Packet Radio Services (GPRS) server.

15. An identifier for use in a contactless payment authorization system, the identifier for use with a mobile communications device in contactless communication with a payment terminal, the identifier comprising:
   a processor for electronically signing an identifying code received from the mobile communications device;
   a transmitting and receiving unit for communicating with the mobile communication device, the transmitting and receiving unit for receiving the identifying code and transmitting the electronically signed identifying code;
   a memory that contains a stored identification number and a key for use in electronically signing the received identifying code; and
   a block for transforming an electromagnetic field of the mobile communication device into electrical energy that is supplied to the processor, the transmitting and receiving unit, and to the memory.

16. The identifier of claim 15, wherein the memory contains a private key for use in electronically signing the identifying code.

17. The identifier of claim 15, further comprising a near-field communication unit.

18. The identifier of claim 15, wherein at least a portion of the memory is configured for separately storing personal data associated with a user.

19. The identifier of claim 18, wherein the portion of the memory that is configured for separately storing the personal data is externally accessible via the transmitting and receiving unit.

20. The identifier of claim 15, wherein the identifier is located in a pendant, a key ring, a label, or an applique.

* * * * *